(12) United States Patent
Orcutt et al.

(10) Patent No.: US 6,560,440 B1
(45) Date of Patent: May 6, 2003

(54) METHOD FOR PRECOMPENSATING FREQUENCY DATA FOR USE IN HIGH-VELOCITY SATELLITE COMMUNICATION SYSTEMS

(75) Inventors: Edward K. Orcutt, Chandler, AZ (US); Randy L. Turcotte, Tempe, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 399 days.

(21) Appl. No.: 09/685,497

(22) Filed: Oct. 10, 2000

(51) Int. Cl.[7] .......................... H04B 7/185; H04B 17/00
(52) U.S. Cl. ...................... 455/13.1; 455/501; 455/67.3
(58) Field of Search ................................ 455/427, 431, 455/12.1, 13.1, 63, 70, 71, 295, 296, 67.1, 67.3, 501; 342/99, 100, 402, 405

(56) References Cited

U.S. PATENT DOCUMENTS 5,432,521 A * 7/1995 Siwiak et al. ................ 342/352
5,874,913 A * 2/1999 Blanchard et al. .......... 342/352
6,356,740 B1 * 3/2002 Malcolm et al. .............. 455/71

* cited by examiner

*Primary Examiner*—Nguyen T. Vo
(74) *Attorney, Agent, or Firm*—Jenner & Block, LLC

(57) ABSTRACT

A satellite vehicle compensation system (100) predicts the motion of two satellite vehicles and enhances the predictions with real-time updates of one or both of the vehicles. Using feedback loops (132, 134), the differences between the prediction and the actual motions are looped back to improve the accuracy of the motion predictor.

1 Claim, 1 Drawing Sheet

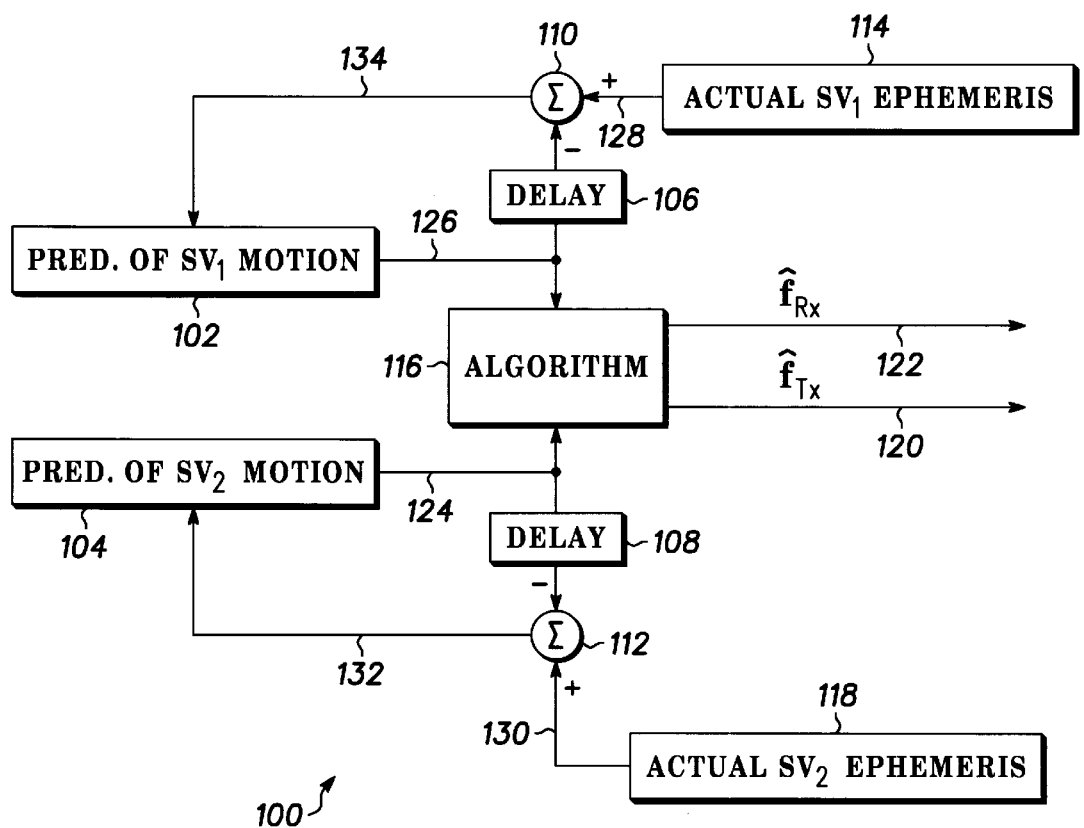

METHOD FOR PRECOMPENSATING FREQUENCY DATA FOR USE IN HIGH-VELOCITY SATELLITE COMMUNICATION SYSTEMS

TECHNICAL FIELD

The present invention relates to satellite communications systems, which include communication between two moving satellites, between one moving satellite and a ground-based station (moving or stationary), between a space-based vehicle and an airborne (but not space-based) vehicle, or any combination of the above.

BACKGROUND ART AND TECHNICAL PROBLEMS

In a satellite communications system, one satellite vehicle ($SV_1$) transmits and receives data from another satellite vehicle ($SV_2$). Even though one or both vehicles may be moving, if the relative distance between the two vehicles is constant, the carrier frequency on which data is transmitted from one vehicle to another is the same carrier frequency received by the receiving vehicle. In the more typical case, the relative motion between the two vehicles in communication is not constant, and Doppler effects come into play. As long as the relative motion between the transmitter and receiver is within the design constraints of those devices, classical techniques, such as those described in Spiker, James J., *Digital Communications by Satellite,* Prentice-Hall, Ch. 12, 1995, may be employed to compensate for the carrier frequency shift due to the relative motion between the two vehicles. For example, a frequency-locked loop or a phase-locked loop technique may be employed to track Doppler frequency shifts and maintain communication between the two vehicles. However, these classical tracking techniques often involve broadening the bandwidth of the frequency tracking device and/or the bandwidth of the receiver's noise limiting front-end filter, which tends to reduce the signal-to-noise ratio of the received signal. When the relative motion between the transmitter and the receiver is unacceptably high, the signal-to-noise ratio can become unacceptably low, rendering known compensation techniques insufficient.

A technique is thus needed which allows satellite vehicles to communicate with one another when the relative motion and the change in relative motion between two vehicles is high, while maintaining an acceptable signal-to-noise ratio of the received signal.

BRIEF DESCRIPTION OF THE DRAWING

The subject invention will hereinafter be described in conjunction with the appended drawing FIGURE, wherein the referenced numerals in the drawing FIGURE correspond to the associated descriptions provided below, and the drawing FIGURE is a schematic block diagram of a preferred embodiment of a frequency compensation system in accordance with the present invention.

DETAILED DESCRIPTION OF THE DRAWING

In a preferred embodiment of the present invention, a first satellite vehicle ($SV_1$) desires to transmit data to a second satellite vehicle ($SV_2$), wherein the second satellite vehicle ($SV_2$) may be a member of a constellation of satellites having known communication protocols. The first satellite vehicle $SV_1$, which in this example is not a member of the constellation, may conveniently communicate with the second satellite vehicle $SV_2$ as long as satellite $SV_1$ comports with the protocols of the constellation to which satellite $SV_2$ belongs. When the relative motion between $SV_1$ and $SV_2$ is sufficiently low, classical compensation techniques may be employed to account for the Dopplar shift in the transmitted frequency as a result of the relative motion between the two vehicles. Typically, the receiving satellite (in this example, $SV_2$) would monitor a frequency range within which the received signal is expected to fall. However, when the Doppler effects render the use of conventional tracking techniques inadequate, the following compensation system may be employed.

Referring now to the drawing FIGURE, a compensation system 100 which, in a preferred embodiment, resides only on $SV_1$, suitably comprises an $SV_1$ motion predictor 102, an $SV_2$ motion predictor 104, and a processor 116 for computing a predictive algorithm. More particularly, $SV_1$ motion predictor 102 suitably comprises a static or dynamic flight plan associated with satellite vehicle $SV_1$, which may include information relating to speed, trajectory, acceleration, and other position and motion information; $SV_2$ motion predictor 104 suitably includes similar functionality for second satellite vehicle $SV_2$. An output 126 of the $SV_1$ motion predictor 102, and an output 124 of the $SV_2$ motion predictor 104, are suitably supplied to processor 116, whereupon processor 116 outputs a predicted transmission carrier frequency signal 120, and a predicted receiver carrier frequency 122 based upon the predicted relative motion between the two vehicles. In the context of the illustrated embodiment, predicted transmission carrier frequency signal 120 represents the extent to which the transmitter on $SV_1$ should compensate its frequency based on the predicted relative motion between the two vehicles; similarly, predicted receiver carrier signal 122 represents the extent to which the receiver on $SV_1$ should compensate for the predicted relative motion between the two vehicles by adjusting to the frequency at which the received signal is expected to arrive at the receiver.

If the information regarding the motion of the two satellite vehicles (contained in respective predictors 102 and 104), as well as the algorithm contained within processor 116 were perfect, vehicles moving relative to one another could always communicate with a very high signal-to-noise ratio. In reality, however, the predictive models of satellite vehicle motion, as well as the algorithms used to calculate frequency compensation, are imperfect and, over time, degradation in frequency compensation will result. Thus, the foregoing compensation model may be enhanced, if desired, by applying, where practicable, real-time updates to the compensation model including ephemeris data of one or both space vehicles.

With continued reference to the drawing FIGURE, a measured $SV_1$ ephemeris data block 114 supplies real-time updates to $SV_1$ motion predictor 102; similarly, a measured $SV_2$ ephemeris data block 118 is configured to supply real-time updates to $SV_2$ motion predictor 104. More particularly, an output 128 of block 114, which comprises real-time information relating to the actual position and/or motion of satellite vehicle $SV_1$, is supplied to a summing node 110. Output 126 of $SV_1$ motion predictor 102 is suitably delayed through a delay element 106 and supplied to node 110, whereupon summing node 110 computes the difference between the predicted motion of first satellite vehicle $SV_1$ and the measured motion of first satellite vehicle $SV_1$. The difference between these two values, represented by a signal 134, is then supplied to $SV_1$ motion predictor 102. Feedback signal 134 drives the error between the measured motion of $SV_1$ (represented by output signal 128) and the predicted motion of $SV_1$ (represented by output signal 126) to a minimum.

In a similar fashion, an output 130 of block 118, which comprises real-time information relating to the actual position and/or motion of satellite vehicle $SV_2$, is supplied to a summing node 112. Output 124 of $SV_2$ motion predictor 104 is suitably delayed through a delay element 108 and supplied to node 112, whereupon summing node 112 computes the difference between the predicted motion of second satellite vehicle $SV_2$ and the measured motion of second satellite vehicle $SV_2$, the difference between these values, represented by a signal 132, is then supplied to $SV_2$ motion predictor 104. Feedback signal 132 drives the error between the measured motion of $SV_2$ (represented by output signal 130) and the predicted motion of $SV_2$ (represented by output signal 124) to a minimum.

By employing real-time position and/or motion data of one or both of the vehicles involved in a communication session to the compensation model as illustrated in the drawing FIGURE, the frequency compensation model can be significantly improved, thereby allowing computation of frequency compensation information, even in the presence of high relative motion dynamics between the two vehicles.

Although the present invention has been described with reference to the drawing FIGURE, those skilled in the art will appreciate that the scope of the invention is not limited to the specific forms shown in the FIGURE. Various modifications, substitutions, and enhancements may be made to the descriptions set forth herein, without departing from the spirit and scope of the invention which is set forth in the appended claim.

What is claimed is:

1. In a satellite communications system involving a satellite vehicle $SV_1$ and a second satellite vehicle $SV_2$ moving relative to one another, a method for compensating at least one of a transmission frequency associated with $SV_1$ and a received frequency associated with $SV_2$, the method comprising the steps of:

predicting a motion of satellite vehicle $SV_1$ and generating a first output signal representative of the predicted motion of satellite vehicle $SV_1$;

predicting a motion of satellite vehicle $SV_2$ and generating a second output signal representative of the predicted motion of satellite vehicle $SV_2$;

supplying said first output signal and said second output signal to a processor and computing in said processor at least one of a compensated transmission frequency and a compensated receiving frequency based on said first output signal and said second output signal;

determining an actual motion of $SV_1$ and generating a third output signal representative of the actual motion of $SV_1$;

determining an actual motion of $SV_2$ and generating a fourth output signal representative of the actual motion of $SV_2$;

supplying said first output signal and said third output signal to a first summing junction and generating a first feedback signal representative of the difference between said first output signal and said third output signal;

supplying said second output signal and said fourth output signal to a second summing junction and generating a second feedback signal representative of the difference between said second output signal and said fourth output signal;

using said first feedback signal to improve the accuracy of said first output signal; and using said second feedback signal to improve the accuracy of said second output signal.

\* \* \* \* \*